3,455,100
REINFORCEMENT FOR ELASTOMERIC ARTICLES
James Sidles, West Richfield, Dennis P. Skala, Akron, and Leonard Skolnik, Cleveland, Ohio, assignors to The B. F. Goodrich Company, New York, N.Y., a corporation of New York
Filed Sept. 26, 1967, Ser. No. 670,694
Int. Cl. D02g 3/36
U.S. Cl. 57—152
8 Claims

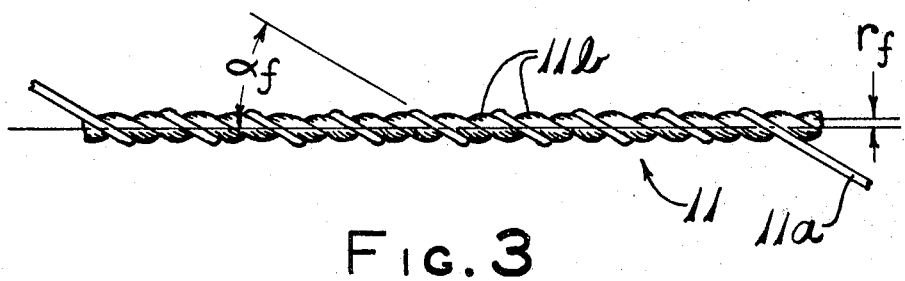
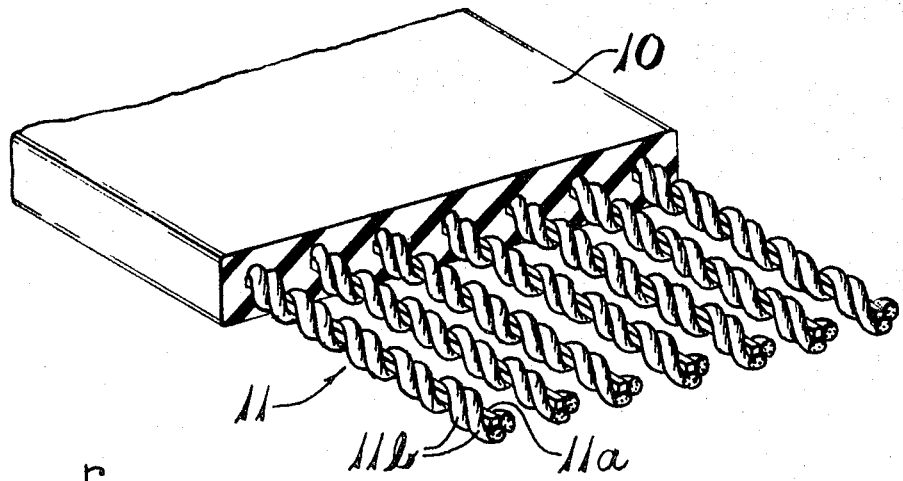
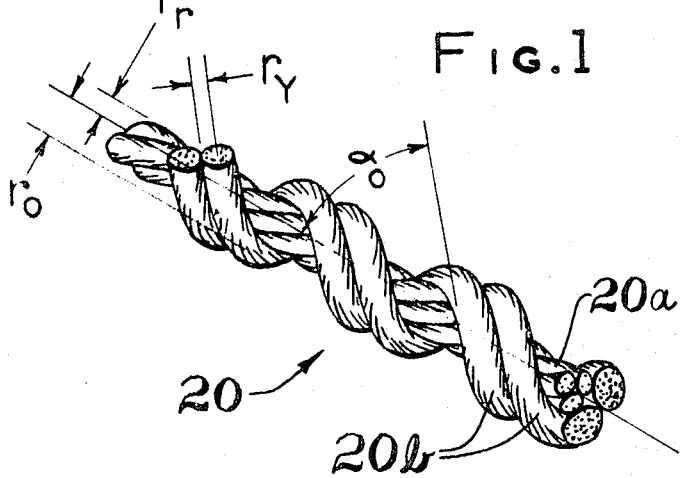
Fig. 3
Fig. 1
Fig. 2
INVENTORS
JAMES SIDLES
DENNIS P. SKALA
LEONARD SKOLNIK United States Patent Office 3,455,100
Patented July 15, 1969

ABSTRACT OF THE DISCLOSURE

Reinforcement for manufacturing cord-reinforced elastomeric articles, comprising stretchable reinforcing cords per se and sheet stock having such cords therein characterized by the cords having initially low tensile modulus which abruptly changes to a substantially higher modulus upon elongation a predetermined and limited amount.

Background of the invention

Many types of articles manufactured of elastomeric material are reinforced with substantially inextensible cords for providing resistance to flexing and adding tensile strength to the article. One common method of manufacturing such articles is to arrange the cords in parallel relationship united by uncured elastomeric material rolled or calendered thereon to form thin sheets or strips, then laminating layers of the unvulcanized sheets or strips to the desired size, shape and cord orientatiotn to form the article. The laminated article is then usually cured or vulcanized in a mold to the desired final shape. One difficulty in this procedure is that the substantial difference in extensibility between the unvulcanized rubber and the substantially inextensible cords tends to negate the formability of the cord reinforced article before vulcanization, as compared with the formability of an article not reinforced with cords.

This dispartiy becomes commercially important in manufacturing when it is necessary to manufacture an elastomeric article of great strength which requires a large number of reinforcing cords, yet has a complex shape or curvature which requires the cords to be flexed and curved severely to comply with the contour of the article. In such an article, the unvulcanized elastomer will readily conform to complex shapes and flow to fit the corresponding contours of a mold by virtue of the extremely low tensile modulus and plastic nature of the elastomer especially when subjected to vulcanizing temperatures. However, the inextensible cords are not as readily deformed and tend to resist bending, flexure and tension, especially when the cords are superimposed upon one another in spaced layers. Thus, it can be readily seen that addition of reinforcing cords to elastomeric articles of manufacture, for increasing the strength of the article, results in decreased formability and thereby limits in many applications the complexity of the shape, or at least adds to the cost and time expended in manufacturing processes to obtain the desired shape.

It is further known that when a cord reinforced vulcanized elastomeric article is subjected to severe compressive loads, or bending to a radius which is small when compared to the thickness of the article, the flexible reinforcing cords are in whole or in part, subjected to compressive stresses which may cause buckling and early failure of the article. For example, the sidewalls of a pneumatic tire buckle when the tire is overloaded for any given state of inflation.

The problems, simply stated have been to find:
(1) Reinforcing cords and ply stock of elastomeric unvulcanized material containing such cords wherein layers of corded elastomeric material could be easily laminated, shaped and/or formed into articles of complex shape as a unit prior to vulcanizing while retaining the required dimensional stability after vulcanization; and (2) the cords and ply stock containing such cords capable of accepting substantial compression and bending without buckling of the cords or of the reinforced article.

Summary of the invention

The present invention solves the above described problems by providing an improved reinforcement for elastomeric articles in the form of cords having different tensile moduli for different degrees of elongation and ply stock comprising such cords embedded in a layer or sheet of unvulcanized elastomeric material. The stretchable cords are characterized by having an initially low tensile modulus, which upon extension of the cords by a predetermined limited amount abruptly changes to substantially higher tensile modulus. The cords comprise a vulcanized elastomeric core having at least one substantially inextensible textile yarn helically wrapped therearound is openly spaced coiled arrangement in the relaxed condition of the cord. The cords and sheet stock incorporating the cords may therefore be substantially stretched or elongated, in the direction of the length of the cords, during lamination into a completed article and at any time prior to vulcanizing. The article formed with such reinforcement may be subsequently vulcanized in the extended or stretched configuration such that the cords have abruptly changed to the higher tensile modulus and therefore behave as essentially inextensible reinforcements but, nevertheless, may be subjected to compressive stresses without buckling. Alternatively, the article may be vulcanized in the relaxed state with the cords at their initial length; this renders the completed article stretchable after vulcanization.

Hence the invention now makes it possible to manufacture known elastomeric articles in a more efficient manner with improved properties. In addition, the invention makes possible the manufacture of elastomeric reinforced articles having properties not heretofore obtainable.

Brief description of the drawings

FIG. 1 is a perspective view of a portion of sheet stock of elastomeric material with one type of stretchable reinforcing cords made in accordance with the invention therein, a part of the elastomer being removed near one end to expose the cords;

FIG. 2 is an enlarged perspective view of another embodiment of the stretchable cords in its relaxed state;

FIG. 3 is a view of the cord per se shown in FIG. 1 with the cord elongated to the region of the higher tensile modulus.

Detailed description

Figure 4:
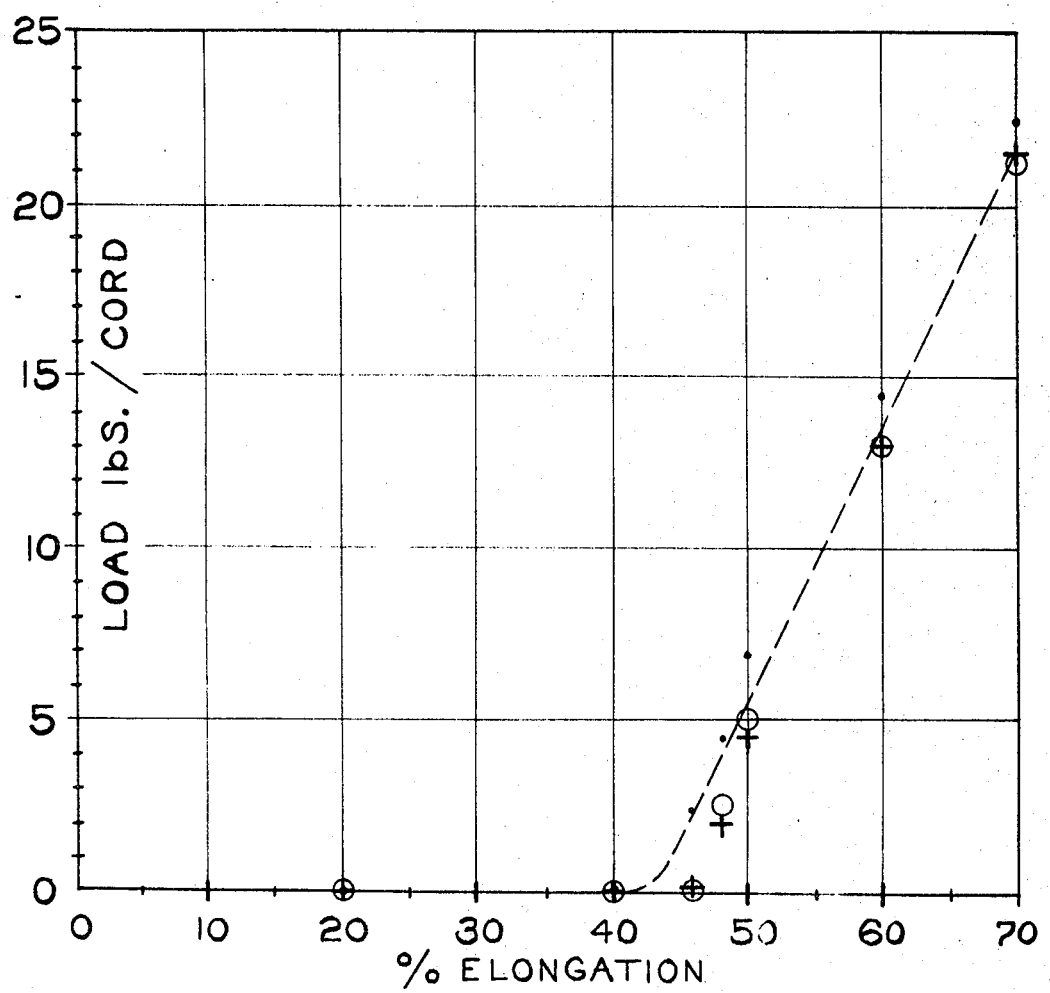
FIG. 4 presents a typical stress-strain plot of a reinforcing cord embodying the present invention.

Referring now to FIG. 1, the invention is illustrated as it is incorporated in ply stock for use in making articles such as tires, hose or belts. The stock comprises uncured elastomeric material 10 calendered or otherwise disposed in flat sheet form with opposite parallel sides and has reinforcing cords 11 embedded centrally therein in parallel spaced planar arrangement. Each of the cords 11 is of the type having different tensile moduli for different degrees of elongation and therefore comprises a core 11a of prevulcanized elastomeric material with at least one, but preferably two or three, twisted yarns 11b of substantially inextensible textile material wrapped helically around the core. In the embodiment shown in FIG. 1 the core 11a has a polygonal cross-section but the core 11a may alternatively have a generally round cross-section since the characteristics of the cord are not limited to use of a core in the form illustrated in FIG. 1.

The textile yarns 11b are in openly-spaced coiled arrangement when the cord 11 is in the unstretched condition. In the presently preferred embodiment, the core 11a is prestretched and pretwisted in preparation for being twisted together with the textile yarns 11b which are then helically wrapped around the core in the opposite direction of twist of the core; however, it is not necessary in all cases to pretwist the core. The core is generally prestretched at least an amount equal to the desired extension of the finished cord 11, and preferably an amount slightly greater. After the yarns 11b have been twisted around the core 11a, the tension is released whereupon the core contracts to its free length and assumes a substantially untwisted shape with the yarns 11b wrapped helically around the core in openly-spaced coiled arrangement as illustrated in FIG. 3.

Referring now to FIG. 2, another embodiment of the invention is shown as comprising a cord 20 having a multiple stranded core 20a formed of a plurality of single strands of prevulcanized elastomeric material, preferably twisted together. For example, the core 20a comprises 3 strands each of #42 gauge elastomeric stock twisted together to initially have approximately 6 Z, or right-hand turns per inch. Two textile yarns 20b, each preferably made of 2200 denier rayon yarn, are initially twisted to approximately 11 Z turns per inch. These yarns are wrapped helically around the core with the two yarns of the twisted singles twisted with the prestretched elastomeric core to produce approximately 6 S, or left-hand turns per inch of the yarns about the core when the latter is in the relaxed state.

Referring again to FIG. 1 and FIG. 3, when the finished cord 11 is stretched a predetermined amount, the helically wrapped yarns 11b become taut so that there is an abrupt change of the tensile modulus of the cord to the substantially higher value. During initial stages of elongation, the modulus of the cord is provided primarily by the stretching of the core; the helically coiled yarns 11b yield without substantial resistance to the form of a tighter coil. When the cord elongation reaches the state wherein the yarn coils have become transformed to substantially a linear configuration, the tensile modulus of the cord changes abruptly to that of the yarns. In other words, the cord then behaves as if the core were not present and further elongation is resisted primarily by the stretch modulus of the yarns. In the stretched state of the cords, the helically wrapped coils of textile yarn become closed and the elastomeric core 1a is squeezed outwardly at the locations between the prior coils of the yarn 11b such that the core 11a essentially becomes helically wrapped around the now substantially straight yarns 11b.

The structure of the cord of the present invention in the elongated state, i.e. to a point beyond the modulus transition, should be contrasted with that of the familiar textile elastic cord known to the clothing industry. The more common elastic cord used in knitted or woven textile fabrics has the textile yarn wound such that the yarn is in closed coil arrangement in the relaxed state. When this type of elastic cord begins to stretch, the helically wrapped yarn radially constricts on the core, whereby the core resists compression from the onset of elongation. The compressive resistance of the core induces tensile stresses in the yarn which in turn contribute substantially to the overall tensile modulus of the cord. In sharp contrast, the yarn arrangement in the cord structure of the present invention, being in openly-spaced helical arrangement, does not completely enclose and does not radially constrict the core. When the cord of the present invention is elongated, the initial modulus of the cord at the onset of elongation is substantially that of the core alone in tension; only negligible tensile stresses are present in the yarn until the predetermined point is reached at which abrupt modulus transition is reached.

The amount of elongation before the cord abruptly changes to the higher tensile modulus may be preselected and the cord parameters determined from the following expression:

$$E = \frac{l_f}{l_o} = \sqrt{1 + 4\pi^2 T_o^2 (r_o^2 - r_f^2)}$$

where E is the extension ratio, or the ratio of final length, i.e. the length at the point of modulus transition, $l_f$, to initial length $l_o$ of the cord 20, $T_o$ is the initial twist in turns per inch of the yarn helix about the core, $T_f$ the final twist in turns per inch of the yarn helix and $$r_o = r_r + r_y$$

where $r_r$ is the radius of the core 20a, $r_y$ is the radius of the yarn 20b, $r_o$ is the initial radius of the yarn helix and $r_f$ is the final radius of the yarn helix at the point of modulus transition.

Referring now to FIG. 3 and FIG. 2, the extension ratio E is related to the initial helix angle $\alpha_o$ and the final helix angle $\alpha_f$ by the following expression:

$$E = \frac{l_f}{l_o} = \frac{\sec \alpha_o}{\sec \alpha_f} = \sqrt{\frac{1 + \tan^2 \alpha_o}{1 + \tan^2 \alpha_f}}$$

where $$\tan \alpha_o = r_o (2\pi T_o)$$

and $$\tan \alpha_f = r_f (2\pi T_f) = \frac{r_f (2\pi T_o)}{E}$$

Substituting in the above radical expression for E, the relations for Tan $\alpha_o$ and Tan $\alpha_f$ and performing algebraic simplification, gives the expression $$T_o^2 = (E^2 - 1) / 4\pi^2 (r_o^2 - r_f^2)$$

Hence, the values of $T_o$ may be computed for known values of E, $r_o$ and $r_f$. For cords having one yarn 20b, $r_f = 0$, for cords 20 having two yarns 20b, $r_f = r_y$ and for cords 20 having 3 yarns 20b, $$r_f = \frac{2\sqrt{3}}{3} r_y$$

Where the yarn denier is known, for rayon cord the value of $r_y$ in millimeters is $r_y = 0.00631$ multiplied by the denier and the value of $r_y$ in inches is 0.00293 multiplied by the denier.

In designing an elastomeric article, such as a tire, the desired extension ratio is usually known or can be chosen to meet usage or manufacturing requirements. In the present embodiment of the invention extension ratios of 30–80% are preferred. However, values of the extension ratio ranging from 5%–150% can be readily achieved and are useful for a variety of reinforced elastomeric articles. Once the extension ratio is selected, the core and yarn sizes are then chosen, preferably such that the radius of the yarn is in the same order of magnitude as that of the core. The desired winding configuration, i.e. the value of the $T_o$ may then be calculated from the above formula.

In one example of cords made in accordance with the invention, 3 strands of No. 42 gauge core rubber where each strand has $$r_r = 1/2 \times 1/42, \quad r_f = .0275$$

from the above formula, have been used. In another example, 3 strands of No. 64 gauge core rubber where each strand has $$r_r = 1/2 \times 1/64, \quad r_f = 0.183$$

from the above formulas, have been used. Using 1650 denier rayon as the yarn 20b, for example, give $r_y = 0.0102$ inch and for 2200 denier rayon yarn 20b, $r_y = 0.0116$ inch from the above expression for $r_y$ in terms of yarn denier. Proceeding further with the design procedure, if, for example, a proposed cord has $E = 1.6$, a 42 gauge core and 3 single rayon yarns 20b of 2200 denier, $T_o$ is found to be 5.4 turns from the expression $$T_o^2 = (E^2-1)/4\pi^2(r_o^2-r_f^2)$$

The value of 1.6 for E was chosen as an example because it is typical of the requirement for cord elongation in manufacturing a pneumatic tire. The sizes of the textile yarn and core are one of the combination sets preferable for construction of a pneumatic tire carcass. Similarly for a cord having $E=1.6$, but using a 64 gauge core and 2 single yarns 20b of 1650 denier, $T_o$ is found to be 7.45 turns per inch. Although the combinations of core size and yarn stranding mentioned above are preferred, other combinations may be used in accordance with the above formulas interrelating the core, yarns and number of turns of twist to the yarn 20b. Generally, values of the core and yarn radius are limited to a maximum of 0.050 inch in the presently preferred form of the invention.

Referring now to FIG. 4, a typical graph of load versus elongation has been plotted for cord of the present invention having two yarns of textile wrapped helically around a single strand core of elastomeric material.

The table below presents the data from which FIG. 4 was derived. Three separate samples were tested and the data for each sample are plotted in FIG. 4 by appropriate symbols as denoted in the table. A smooth curve has been faired through the test points to illustrate the trend of the data and is shown in FIG. 4 as a dashed line.

TABLE
[Load: Lbs./cord]

| Sample symbol Fig. 4 | Percent elongation | | | | | | |
|---|---|---|---|---|---|---|---|
| | 20 | 40 | 46 | 48 | 50 | 60 | 70 |
| ● | 0 | .10 | 2.4 | 4.5 | 6.8 | 14.5 | 22.5 |
| ○ | 0 | .05 | 0.6 | 2.5 | 5.0 | 13.0 | 21.2 |
| + | 0 | .05 | .50 | 2.0 | 4.5 | 13.0 | 21.5 |

The textile yarn is 1650 denier rayon having a radius $r_y = .010$ inch and the core radius is .0085 inch with the yarn wrapped at 12.05 turns per inch around the core. A 5 inch cord specimen loaded at a rate of 100%/min. elongation was used for each of the three tests. From the test points it can be seen that no appreciable load was measured until the modulus transition point in the range of 40–48% elongation. It should be noted that the curve, as supported by the test data, displays a linear relation between load and strain subsequent to modulus transition. This characteristic of the curve illustrates that the core does not contribute appreciably to the tension resistance after modulus transition. Comparing the transition point of the cord data of FIG. 4 with the theoretical value of E for the cord of FIG. 4 computed from the above formulas for $T_o$ which is 1.54, it can be seen that the cord acts under load substantially as predicted within acceptable limits.

The ply or sheet stock of the present invention may be made by drum winding the cord 11 or 20 over a sheet of uncured elastomeric material and then covering the cords with a subsequent layer of uncured elastomeric material. When ply stock is made in this manner, the cord 11 or 20 is wound under tension sufficient to cause the cord to be elongated to the region of the higher tensile modulus. Subsequent to winding, the cord 11 or 20 is allowed to relax to nearly its initially free length prior to vulcanization. Alternatively, ply or sheet stock may be prepared by calendering elastomeric material upon the cords while the latter are under tension sufficient to cause elongation into the higher tensile modulus region. The tension is released from the cords 20 subsequent to calendering and the cords are permitted to relax to nearly their unstretched length with a corresponding reduction in length of the elastomeric material.

Modifications and adaptations of the herein disclosed embodiments of the invention may be made by those having ordinary skill in the art within the ambit of the invention, which is limited only by the spirit and scope of the appended claims.

We claim:

1. A reinforcing member for elastomeric articles comprising a core of vulcanized elastomeric material with at least one textile yarn wrapped helically therearound in a single layer, as expressed by the formula $$T_o = \left\{\frac{E^2-1}{4\pi^2[(r_y+r_r)^2-r_f^2]}\right\}^{1/2}$$

where $T_o$ is the number of turns per inch of the yarn in the relaxed condition of the member, E is the extension ratio of the member based on elongation to a point of abrupt modulus transition and is in the range 1.05 to 2.50, $r_r$ is the radius of the elastomeric core which does not exceed .050 inch, $r_y$ is the radius of the yarn which does not exceed .050 inch, where $r_f=0$ for cords having one yarn, $r_f=r_y$ for cords having two yarns, and where $$r_f = \frac{2\sqrt{3}}{3}r_y$$

for cords having three yarns.

2. A reinforcing member as defined in claim 1 wherein E is preferably in the range of 1.5 to 1.6, $r_r$ is in the range of .010 to .012 inch, $r_y$ is in the order of .010–.012 inch with three individually pre-twisted yarns of this radius wrapped about said core and $T_o$ is approximately 9–11 turns per inch.

3. A reinforcing member as defined in claim 1 wherein E is preferably substantially 1.7, $r_r$ is substantially .025 inch and $r_y$ is substantially .0102 inch with two individually pre-twisted yarns of this radius wrapped about the said core and $T_o$ is approximately 6.5.

4. A reinforcing member as defined in claim 1, wherein the radius of the yarn is generally the same as radius of the core.

5. Sheet stock for manufacturing reinforced elastomeric articles comprising: a layer of unvulcanized elastomeric material having individually continuous cords of stretchable material embedded therein in spaced parallel planar relationship, the said sheet stock and cords having initially a low longitudinal tensile modulus in the direction of the cords and upon elongation of a predetermined and limited amount abruptly changes to a substantially higher tensile modulus, characterized by each of said cords having
 (a) a continuous core of prevulcanized elastomeric material,
 (b) at least one yarn of substantially inextensible textile material wrapped helically around said core in openly spaced coil arrangement when said cord is unstretched,
 (c) the relaxed diameter of the textile yarn being generally the same as the relaxed diameter of the core, and
 (d) said cords have a predetermined elastic elongation within the range of 5–150%.

6. The sheet stock as defined in claim 5, wherein the core of said cords is at least two strands of prevulcanized elastomeric material.

7. The sheet stock as defined in claim 6, wherein the core is pre-twisted in the opposite sense from the yarns wrapped therearound.

8. The sheet stock as defined in claim 5, wherein the ratio of extended length of the cords to the length thereof at the said predetermined point of modulus transition to the initial length is defined by the expression $$E = \frac{l_f}{l_o} = [1 + 4\pi^2 T_o^2(r_o^2 - r_f^2)]^{1/2}$$

wherein $l_f$ is the extended length, $l_o$ is the initial length, $T_o$ is the initial twist of the cords in turns per inch, $r_o = r_r + r_y$, where $r_r$ is the radius of the core, $r_y$ is the radius of the yarn, $r_o$ is the initial helix radius of the yarn path, where $r_y$ does not exceed .050 inch, and $r_x$ does not exceed .050 inch.

References Cited

UNITED STATES PATENTS

| | | | |
|---|---|---|---|
| 3,011,302 | 12/1961 | Rupprecht | 57—163 XR |
| 3,133,584 | 5/1964 | Lang | 152—359 |
| 3,217,778 | 11/1965 | Kovac et al. | 152—359 |
| 3,243,338 | 3/1966 | Jackson | 152—359 XR |

FOREIGN PATENTS

| | | |
|---|---|---|
| 570,338 | 1/1933 | Germany. |
| 757,597 | 10/1944 | Germany. |

STANLEY N. GILREATH, Primary Examiner

WERNER H. SCHROEDER, Assistant Examiner

U.S. Cl. X.R.

57—140, 163; 152—356, 359; 161—77, 175

PO-1050
(5/69)

UNITED STATES PATENT OFFICE
CERTIFICATE OF CORRECTION

Patent No. 3,455,100        Dated July 15, 1969

Inventor(s) James Sidles et al

It is certified that error appears in the above-identified patent and that said Letters Patent are hereby corrected as shown below:

Column 3, line 50 "core 1 a" should read -- core 11a --.

Column 4, line 66, that portion of the expression reading "$r_f = 0.183$" should read -- $r_f = .0183$ --.

SIGNED AND
SEALED

SEP 30 1969

(SEAL)
Attest:

Edward M. Fletcher, Jr.
Attesting Officer

WILLIAM E. SCHUYLER, JR.
Commissioner of Patents